(12) United States Patent
Parsons et al.

(10) Patent No.: US 12,351,336 B2
(45) Date of Patent: Jul. 8, 2025

(54) AUTOMATICALLY PITCH AND YAW RESPONSIVE AIRCRAFT LAUNCHING SYSTEM

(71) Applicant: VU Holdings, LLC, Hollywood, MD (US)

(72) Inventors: Kurt Parsons, Hollywood, MD (US); Dan Edwards, Hollywood, MD (US)

(73) Assignee: VU Holdings, LLC, Hollywood, MD (US)

( * ) Notice: Subject to any disclaimer, the term of this patent is extended or adjusted under 35 U.S.C. 154(b) by 0 days.

(21) Appl. No.: 17/724,007

(22) Filed: Apr. 19, 2022

(65) Prior Publication Data
US 2022/0340298 A1    Oct. 27, 2022

Related U.S. Application Data

(60) Provisional application No. 63/178,455, filed on Apr. 22, 2021.

(51) Int. Cl.
*B64F 1/10* (2006.01)
*B60P 3/11* (2006.01)
(Continued)

(52) U.S. Cl.
CPC ...... *B64F 1/10* (2013.01); *B60P 3/11* (2013.01); *B64U 10/25* (2023.01); *B64U 30/10* (2023.01); *B64U 70/93* (2023.01)

(58) Field of Classification Search
CPC ...... B64F 1/04; B64F 1/06; B64F 1/10; B64F 5/50; B64U 70/00; B64U 70/10;
(Continued)

(56) References Cited

U.S. PATENT DOCUMENTS 2,135,033 A    11/1938  Courtney
4,678,143 A     7/1987  Griffin
(Continued)

FOREIGN PATENT DOCUMENTS

CN    203450375      2/2014
DE      4118330    12/1992
(Continued)

OTHER PUBLICATIONS

International Search Report issued in co-pending application No. PCT/US22/25332, dated Jan. 20, 2023.
(Continued)

*Primary Examiner* — Joshua J Michener
*Assistant Examiner* — Arfan Y. Sinaki
(74) *Attorney, Agent, or Firm* — Whiteford, Taylor & Preston, LLP; Gregory M. Stone

(57) ABSTRACT

A stacked panel tube bundle for an air cooled steam condenser having two sets of condensing tubes, one set arranged above the other, the first (lower) set of tubes in direct fluid communication with a combined steam delivery/condensate collection manifold at a bottom end and in indirect fluid communication with a non-condensable collection manifold via an L-shaped extension member; the second (upper) set of tubes in direct fluid communication with the non-condensable collection manifold at the top, and in indirect fluid communication with the combined steam delivery/condensate collection manifold via an L-shaped extension member.

18 Claims, 15 Drawing Sheets

(51) Int. Cl.
  *B64U 10/25* (2023.01)
  *B64U 30/10* (2023.01)
  *B64U 70/00* (2023.01)
  *B64U 70/93* (2023.01)

(58) Field of Classification Search
  CPC ........ B64U 70/50; B64U 70/70; B64U 70/90;
              B64U 80/80; B64U 80/86; B60P 3/11
  See application file for complete search history.

(56) References Cited

U.S. PATENT DOCUMENTS

| | | |
|---|---|---|
| 5,626,310 A | 5/1997 | Kelly |
| 6,457,673 B1 | 10/2002 | Miller |
| 7,665,691 B2 | 2/2010 | Hanzlick et al. |
| 9,783,322 B2 | 10/2017 | Tully et al. |
| 2008/0203220 A1* | 8/2008 | Hanzlick .................. B64F 1/10 244/63 |
| 2009/0314883 A1 | 12/2009 | Arlton et al. |
| 2012/0210853 A1 | 8/2012 | Abershitz et al. |
| 2016/0325849 A1* | 11/2016 | Miller .................. B64F 1/0297 |
| 2018/0099764 A1* | 4/2018 | Schill .................... B64C 39/024 |
| 2019/0047726 A1 | 2/2019 | Carthew et al. |

FOREIGN PATENT DOCUMENTS

| | | | | |
|---|---|---|---|---|
| KR | 20170063048 A | * | 6/2017 | ................ B64F 1/06 |
| WO | WO-2010031384 A2 | * | 3/2010 | ................ B64F 1/06 |
| WO | 2012030300 | | 3/2012 | |

OTHER PUBLICATIONS

I. Krzysztofik, and Z. Korubaba, "Adaptive Control of Anti-Aircraft Missile Launcher Mounted on a Mobile Base," Theorectical & Applied Mechanics Letters, pp. 1-4, 2012.

"Robonic MC2555LLR Pneumatic UAV Launcher," Robonic, pp. 1-2.

* cited by examiner

AUTOMATICALLY PITCH AND YAW RESPONSIVE AIRCRAFT LAUNCHING SYSTEM

CROSS REFERENCE TO RELATED APPLICATIONS

This application is based upon and claims the benefit of U.S. Provisional Application No. 63/178,455 titled "Automatically Pitch and Yaw Responsive Aircraft Launching System," filed with the United States Patent & Trademark Office on Apr. 22, 2021, the specification of which is incorporated herein by reference in its entirety.

FIELD OF THE INVENTION

The present invention relates generally to systems for launching aircraft, and more particularly to aircraft launching systems that automatically adjust aircraft pitch and yaw during a ground-vehicle based launching operation.

BACKGROUND OF THE INVENTION

Certain aircraft, and particularly lightweight aircraft having minimal independent means for propulsion, may be aided in takeoff by being launched from a ground vehicle. Such lightweight aircraft may include, for example, unmanned aerial vehicles ("UAV"), which typically have a body and fixed wings attached to the body. In certain configurations, the body supports a motor and a propeller for powered flight. Such lightweight UAVs may carry an advantage over other aircraft in that they may have extended flight times and extended ranges over typical aircraft, making them particularly useful for applications that would benefit from such extended flight times and ranges.

In certain configurations, the launching of such lightweight UAVs may present a challenge. For example, UAVs may be launched with some configuration of a launching aid, such as a ground vehicle to which the UAV is temporarily attached to reach a sufficient speed for lift off. However, such ground vehicle-based launching systems typically fix the position of the aircraft with respect to the ground vehicle until the point of launch, thus potentially forcing the UAV to travel in a direction not aligned with a headwind and thus subjecting the UAV to significant crosswinds as it is carried by the moving vehicle, and likewise requiring a very sudden change in direction immediately after launch to align with the prevailing headwind. It would therefore be advantageous to provide a ground vehicle-based launching system that is capable of reliably carrying a UAV as it travels to reach a takeoff speed and that enables take off from the ground vehicle with minimally required interaction from an operator once the UAV has reached an appropriate liftoff attitude.

SUMMARY OF THE INVENTION

Disclosed herein is a ground vehicle-based aircraft launching system that avoids one or more disadvantages of the prior art, particularly by automatically adjusting aircraft pitch and yaw during a ground vehicle-based launching operation, and by automatically releasing the aircraft upon attainment of a pre-designated lift angle with respect to the ground vehicle and the launching system. In accordance with certain aspects of an embodiment of the invention, such a launcher may be particularly configured to transfer primary thrust direction loads, allowing the aircraft to freely pitch and yaw based on prevailing winds and aerodynamics.

A latch mechanism on the launching system may be provided that moves in both the yaw and pitch directions with the aircraft, and maintains a positive lock on the aircraft prior to its release from the launching system. A yaw mechanism allows passive zeroing of sideslip winds, which in turn may avoid yawing, rolling, and/or yaw-roll coupled induced roll forces.

In accordance with certain aspects of an embodiment of the invention, a towed aircraft support frame is provided that carries the aircraft during a towed launching process. The frame holds the fuselage of the aircraft and allows the aircraft to move in the pitch and yaw directions while the aircraft is held in the frame and as the aircraft is towed during launch, thus letting it move in similar fashion to a weathervane and face directly into the wind, even if the direction of travel of the towing vehicle is not into the wind. The latch mechanism holds the aircraft to the frame until actuated, and moves with the movable portions of the frame to hold the aircraft during yaw and pitch changes. More particularly, the latch mechanism is configured to move with the aircraft in the pitch and yaw directions until release of the aircraft (preferably automatically upon attainment by the aircraft of a pre-designated pitch angle), maintaining a positive lock on the aircraft until the desired launching pitch angle is achieved. Preferably, a yaw dampening mechanism is provided and configured to reduce the yaw rate when desired.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The invention may be understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
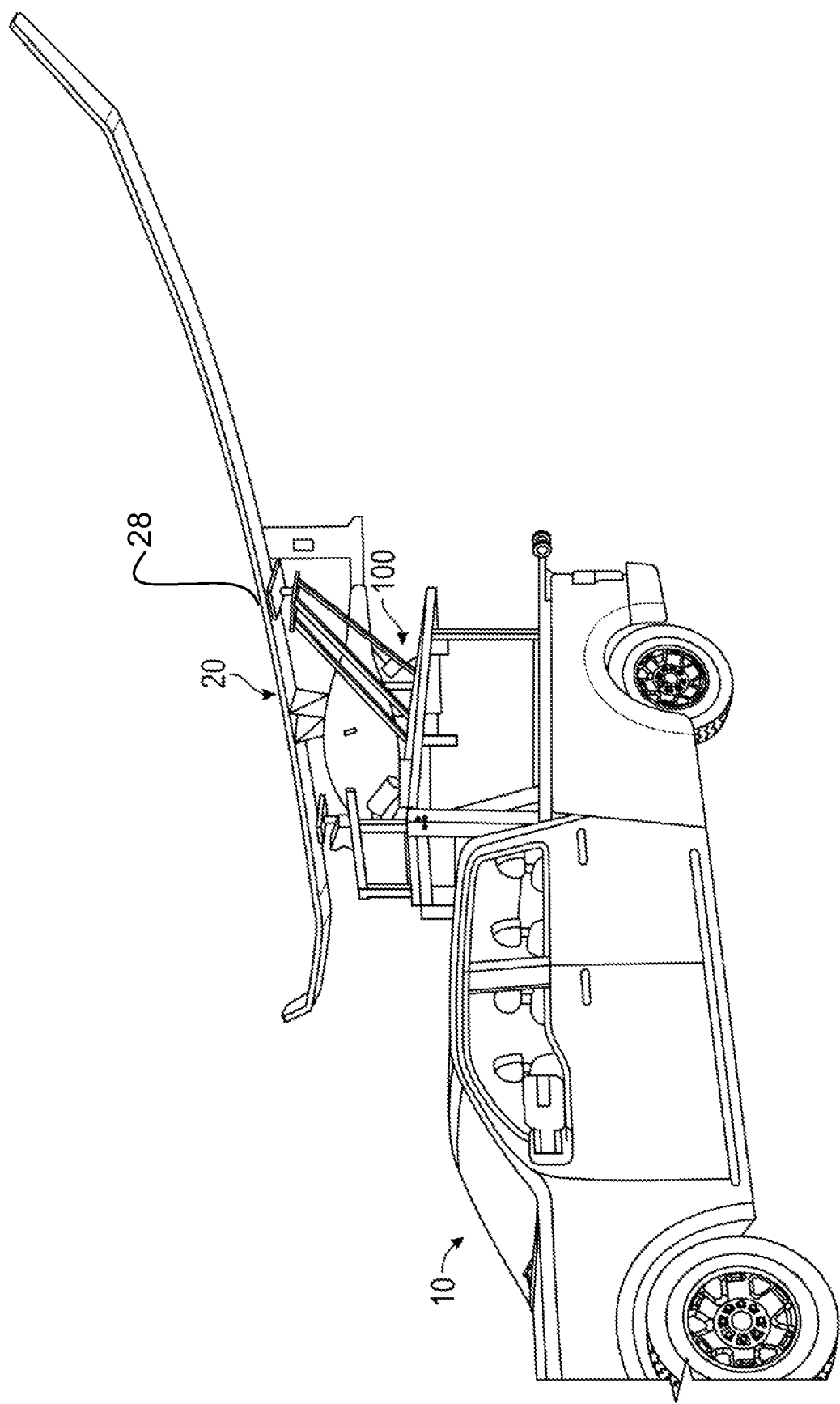
FIG. 1 is a perspective view of a UAV on a ground vehicle-based launching system in accordance with certain aspects of an embodiment of the invention.

In accordance with certain aspects of an embodiment, when launching from a ground vehicle, such as a truck 10 as shown in FIG. 1, using a ground vehicle-based aircraft launching system 100 configured in accordance with aspects of the invention may result in high reliability, low structural loading takeoff, such that the aircraft 20 smoothly transitions from pre-launch on a cradle of the launching system to a steady climb, even in heavy crosswinds. In such launching operation, the truck 10 or other ground vehicle accelerates with the aircraft 20 in its cradle and the aircraft engine running, for example at full throttle. As discussed in greater detail below, a yaw bearing allows the aircraft 20 and launcher to rotate into the wind to zero sideslip angle. The aircraft launching system 100 mounts aircraft 20 on the ground vehicle 10 at zero-lift incidence, such that there is no aerodynamic lifting force when the aircraft 20 is sitting on the cradle of the launching system 100. A mechanical safety release may be activated manually at stall airspeed, and the aircraft 20 sits stationary as the ground vehicle 10 continues to accelerate to the desired takeoff airspeed (which may be determined by aircraft mass). In a particularly preferred embodiment, the mechanical launch release may be activated in response to the pitch angle achieved by the aircraft and its support on the frame, in which case the latch automatically releases upon the aircraft 20 reaching a predetermined pitch angle. Once the desired takeoff airspeed has been achieved and the release has been manually or automatically actuated, an up-elevator command rotates the tail down, providing angle of attack for the wing 28 to provide lift. The aircraft then gently lifts off of the launch cradle and climbs under its own power. In a crosswind, the takeoff occurs with the aircraft at an angle relative to the runway heading.

Figure 2:
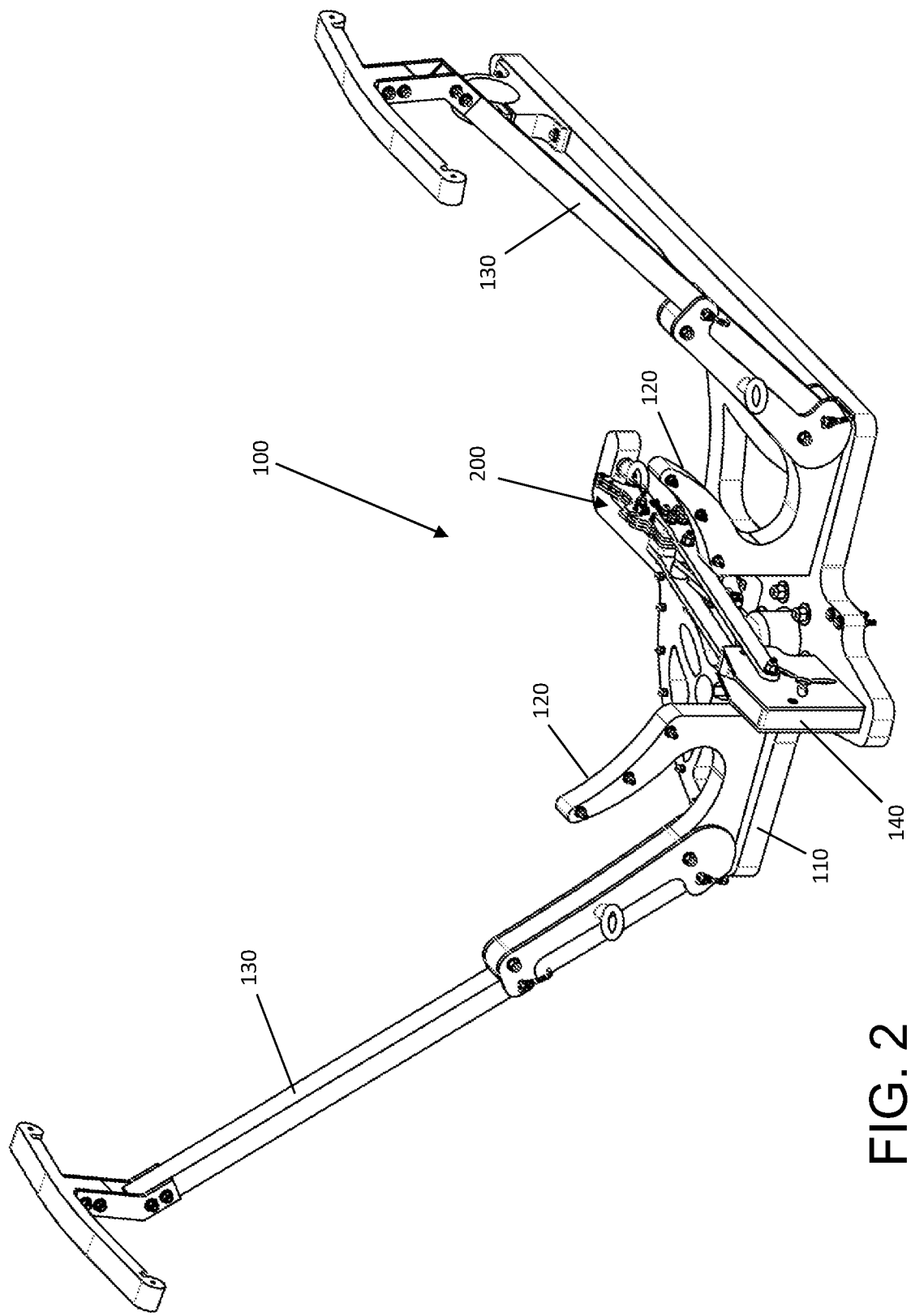
FIG. 2 is a close-up, rear perspective view of a UAV launching system for use on a ground vehicle in accordance with certain aspects of an embodiment of the invention.

FIG. 2 is a close-up, rear perspective view of a launching system 100 in accordance with certain aspects of an embodiment of the invention. As described above and with reference to FIG. 1, such launching system 100 may be mounted to a frame that is carried by a ground vehicle, such as truck 10, and launching system 100 when in use may carry a UAV 20, although such ground vehicle 10, UAV 20, and the frame for carrying launching system 100 are omitted from FIG. 2 for clarity of viewing launching system 100. In summary, launching system 100 includes a horizontally pivotable base plate 110 that may pivot about a vertical axis, UAV fuselage supports 120 and wing supports 130 that hold the fuselage and wings, respectively, of a UAV when positioned on launching system 100, and a latch mechanism 200 that is pivotably mounted to the base plate 110 for pivoting about a horizontal axis (i.e., perpendicular to the vertical axis around which base plate 110 pivots) to vary the pitch angle of the latch mechanism, and that engages a cross pin 201 on a nose skid on the underside of the UAV to hold the UAV to launching system 100 until a desired, pre-designated pitch angle has been attained at which the UAV may safely launch from the launching system 100. Each of the foregoing major system elements will now be discussed in greater detail below.

Figure 3:
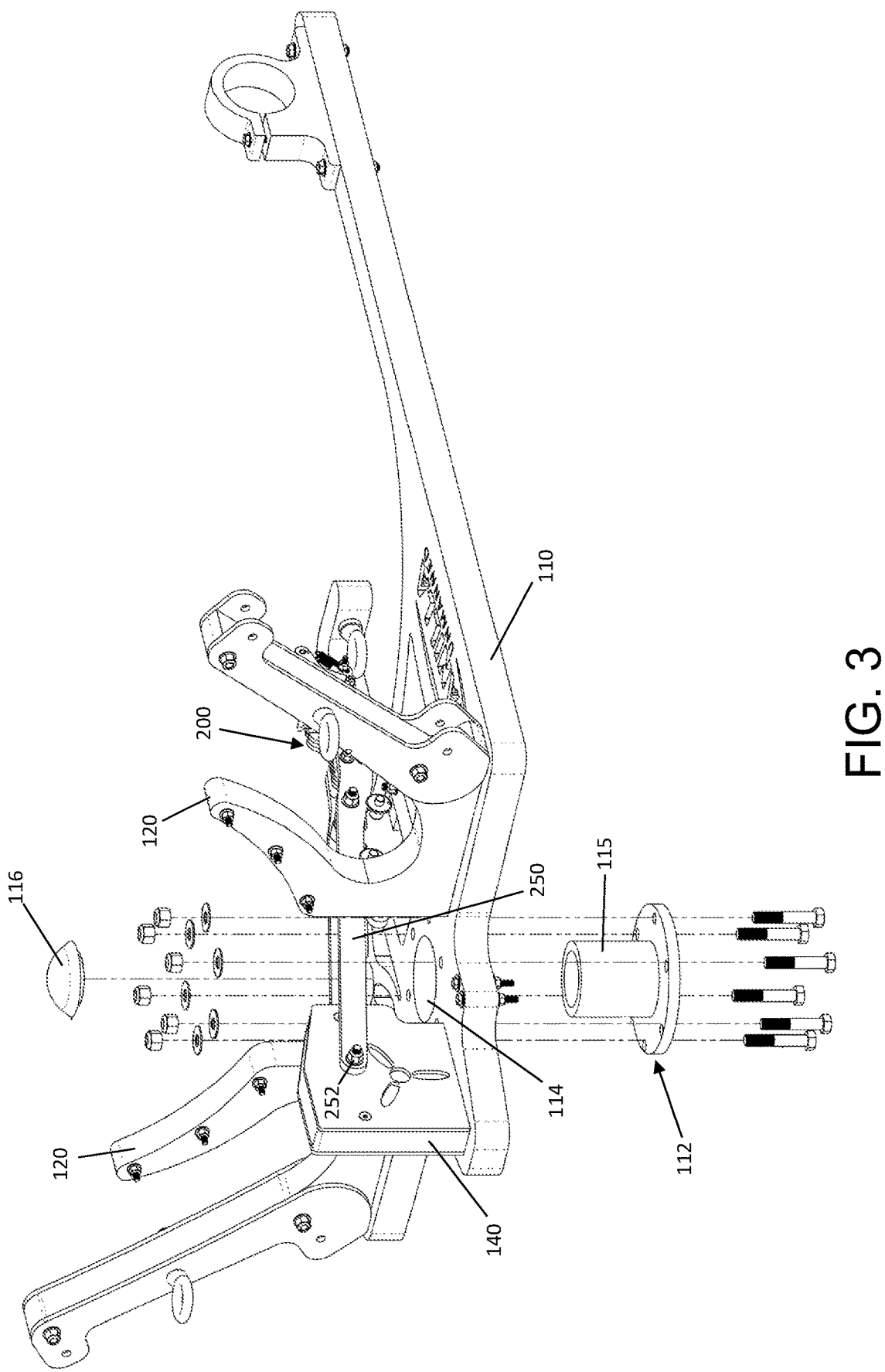
FIG. 3 is a perspective view of components of the launching system of FIG. 2 particularly showing a pivot bearing.

With continuing reference to FIG. 2 and the close-up view of launching system 100 of FIG. 3 (in which wing supports 130 are removed for clarity), when positioned on launcher system 100, a wheel cup 140 is positioned to receive the landing wheel of the aircraft, which wheel cup 140 is affixed to the top surface of base plate 110. Wheel cup 140 serves as a limited retention feature, which ensures that once the aircraft is released from the latch mechanism 200, the aircraft does not roll off of the launching system. The aircraft must be capable of generating a minimum amount of vertical lift in order to raise itself above the rear edge of the wheel cup 140. This limited retention allows just enough time for the aircraft to pitch up and become airborne, safely clearing the launching system 100.

Figure 4:
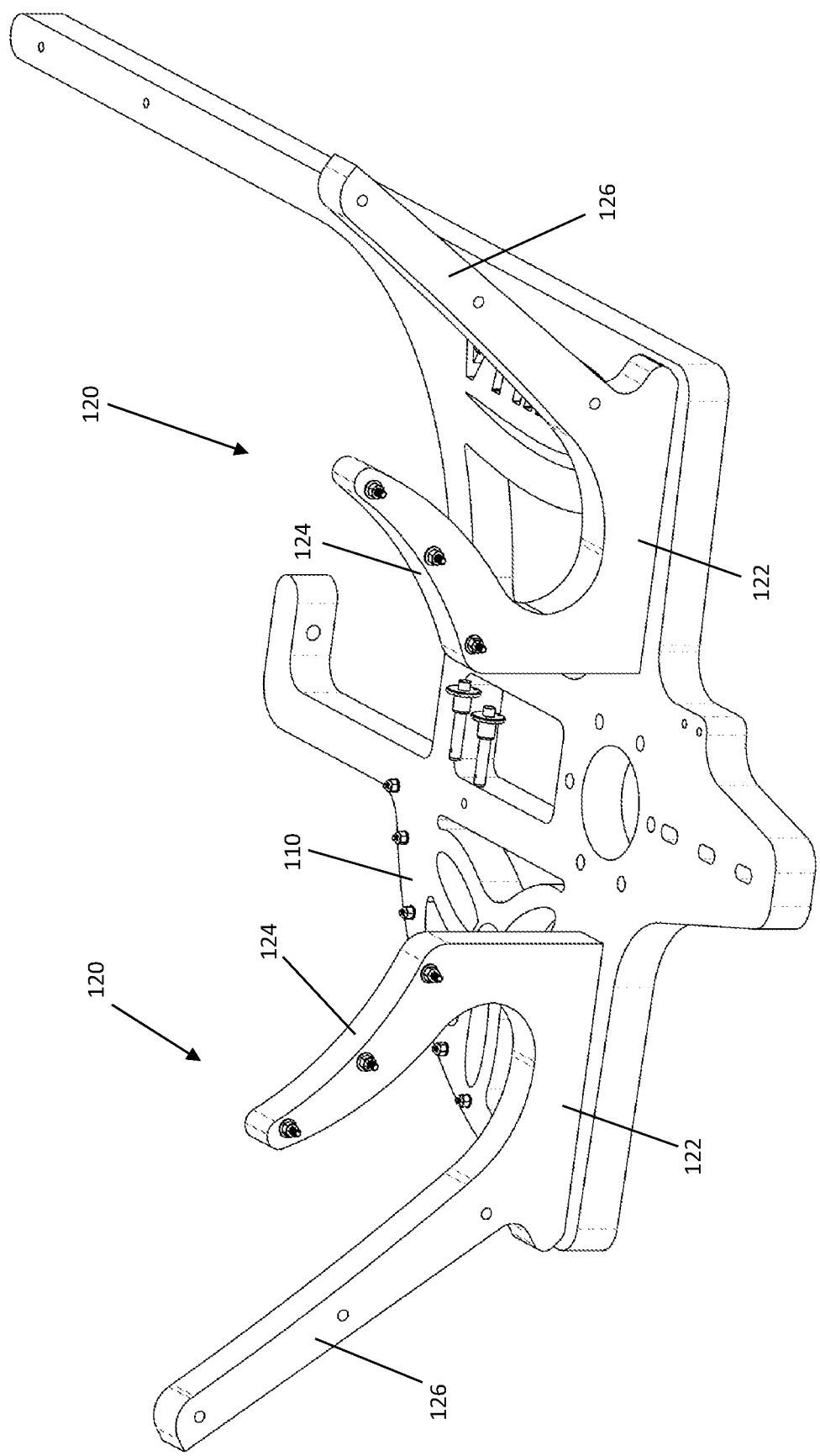
FIG. 4 is a perspective view of a base plate and fuselage support for use in the launching system of FIG. 2.

Further, with continuing reference to FIG. 3 and the perspective view of FIG. 4 (showing only fuselage support 120 and base plate 110 for clarity), fuselage support 120 comprises two arms 122 having interior fuselage cradles 124 and outer extension arms 126 for supporting wing support tubes 132 of wing supports 130, as discussed in greater detail below. Arms 122 are directly affixed to the top face of base plate 110, such as by way of bolts, screws, or similarly configured connectors. Interior fuselage cradles 124 of arms 122 form a generally U-shaped cradle to support the UAV at its maximum fuselage diameter, providing restraint from lateral shifts of the aircraft in launching system 100, such as when the aircraft is in the nose down position. The aircraft on launching system 100 assumes such nose-down position prior to launch as the aircraft is accelerated to a release velocity. As the aircraft pitches upward (as discussed in detail below), a separation is created from the U-shaped cradle allowing free movement of the aircraft.

Figure 5:
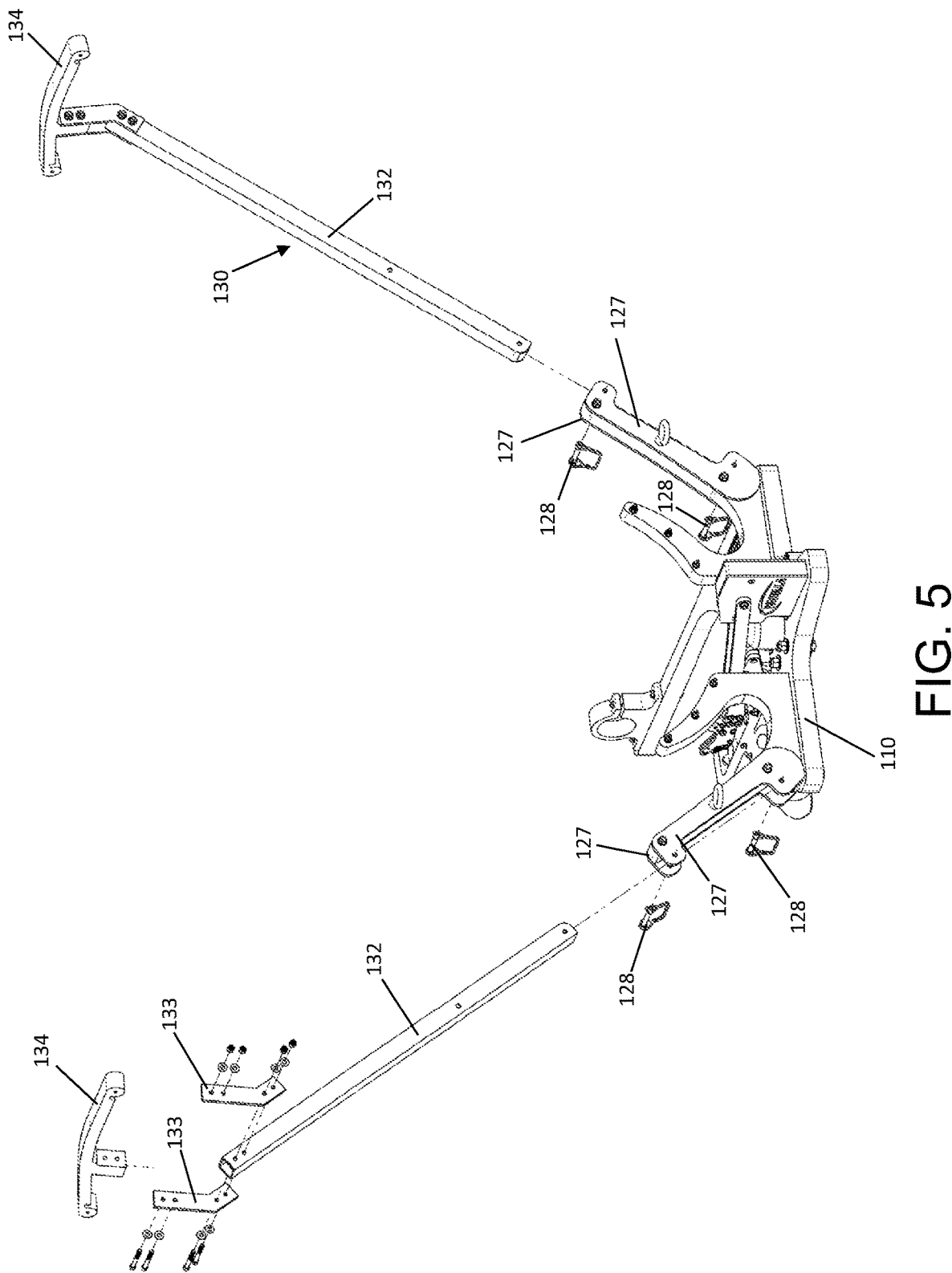
FIG. 5 is a partially exploded view of the launching system of FIG. 2 showing details of wing supports.

As best viewed in FIG. 5, wing supports 130 form outriggers that help to further restrict movement of the aircraft when in the nose down position, and that particularly prevent tip-over or roll of the aircraft during ground maneuvering or in crosswind gusts, as well as well as during staging of the aircraft on launching system 100. Each wing support 130 includes a wing support tube 132 extending upwards from each extension arm 126 of fuselage support 120 and a generally T-shaped wing support arm 134 held to each wing support tube 132 via a bracket 133. Preferably, each extension arm 126 of fuselage support 120 mounts arm brackets 127 on front and back sides of each extension arm 126 to brace the front and back sides of each wing support tube 132 and removably hold each wing support tube 132 in place via a series of clips 128, such as wire lock clevis pins or similarly configured releasable connectors. Each wing support 130 freely separates from the underwing surface of the aircraft once the aircraft pitches upward during the launching process.

With this configuration, latch mechanism 200 is configured to hold the nose of an aircraft mounted on launching system 100 down towards base plate 110 to prevent the aircraft from rolling forward or aft during ground vehicle accelerations and decelerations. Latch mechanism 200 provides positive restraint to hold the aircraft in a pre-release condition, and more particularly in a nose-down orientation prior to its release from launching system 100. For example, in certain exemplary configurations, the aircraft may be held on launching system 100 in a pre-release condition assuming an 8° nose-down attitude and a 25° nose-down elevator trim setting to correspond to a zero-lift angle of attack with nose-down pitching moment.

As noted above, horizontally pivotable base plate 110 is mounted to pivot about a vertical axis extending through horizontally oriented base plate 110. As best viewed in FIG. 3, a hub 112 may be affixed to the frame that carries launch system 100 or such other structure on the ground vehicle 10 as will provide a fixed point of attachment for launching system 100 as will occur to those skilled in the art. A shaft 115 of hub 112 extends upward through a hub receiver 114, and an attachment ring surrounding the shaft 115 may be affixed to the underside of base plate 110 via bolts, screws, or similarly configured connectors. Hub 112 serves as the primary support component that anchors the rotational portion of the launching system 100 and the aircraft. In an exemplary configuration, the hub 112 is capable of supporting the full load of the aircraft while allowing smooth yaw movement as the aircraft "windvanes" into the oncoming air during the run-up to a release velocity. A hub cover 116 may be provided over the top of shaft 115 of hub 112. Hub 112 is mounted to base plate 110 so as to enable rotation of base plate 110 about shaft 115, thus forming a pivot bearing between launching system 100 and the ground vehicle carrying launching system 100. In a crosswind condition, an aircraft mounted on launching system 100 may freely pivot into the crosswind naturally, resulting in zeroing out the sideslip angle. This may be particularly important for aircraft that have no ailerons to hold the wings level or have roll-yaw coupling aerodynamic forces. Without such yaw pivot bearing, crosswind launches could result in high roll angles as the aircraft weathervanes into the wind after launch, as a result of the yaw-roll coupling from dihedral effect. Maximum allowable crosswinds during launch may be greatly increased using the yaw pivot configured as described herein compared to previously employed cart-launch methods, which require close alignment between the runway and wind direction.

Figure 6:
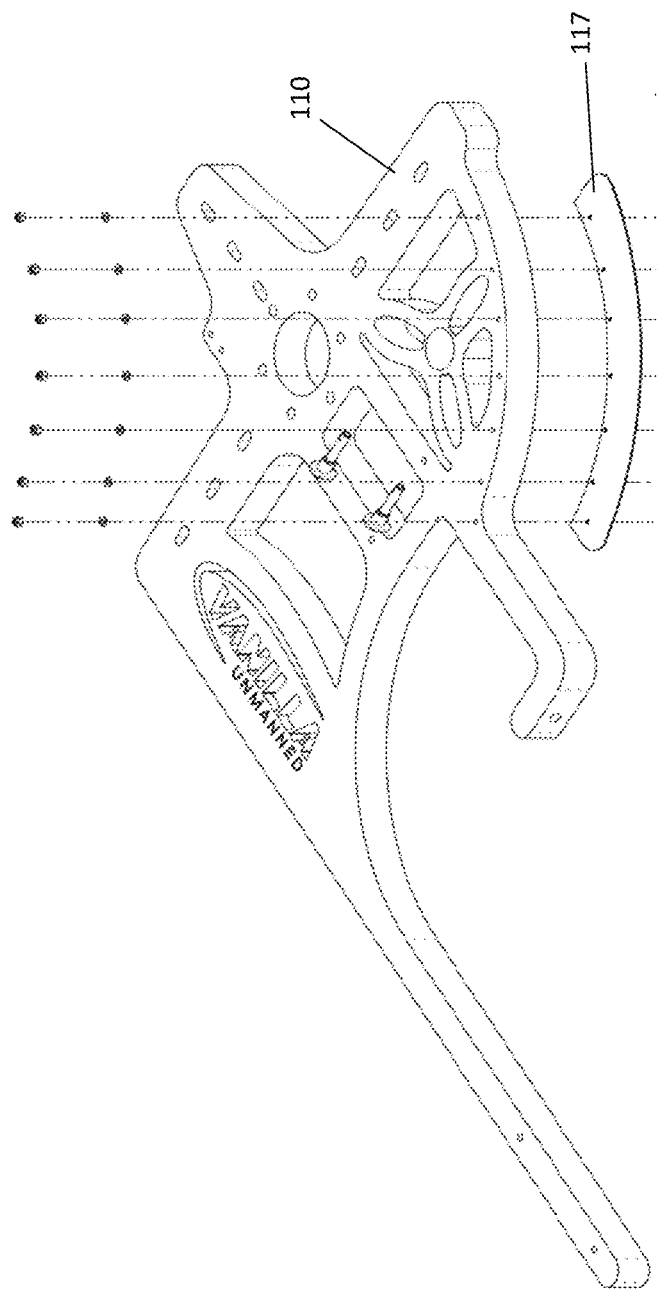
FIG. 6 is an exploded view of a base plate and yaw brake disc for use in the launching system of FIG. 2.
Figure 7:
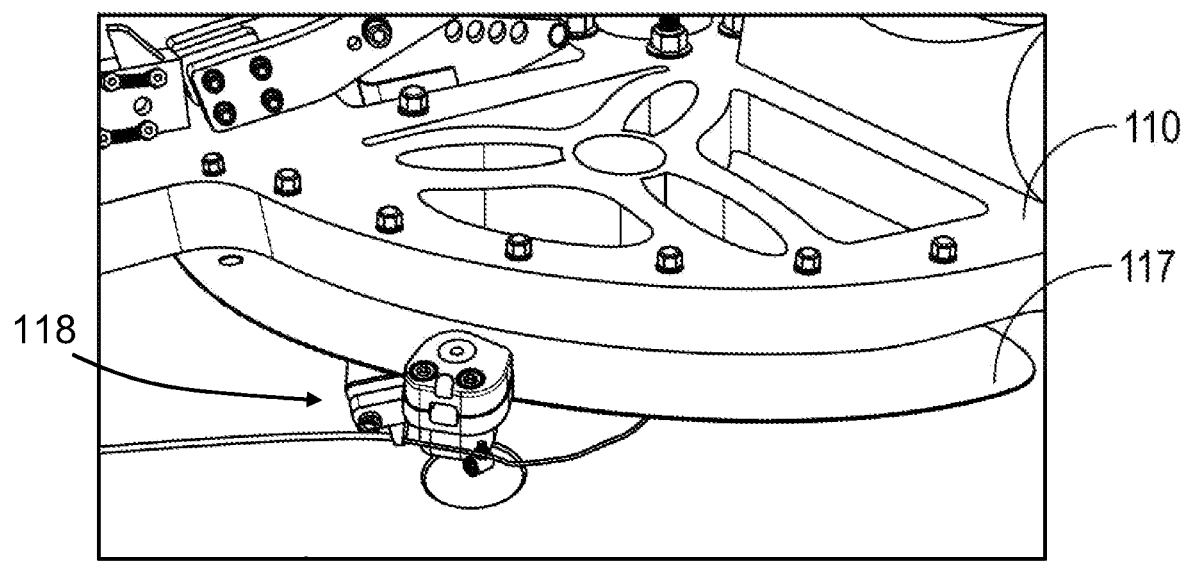
FIG. 7 is a perspective view of a brake assembly engaging the yaw brake disc of FIG. 6.
Figure 8:
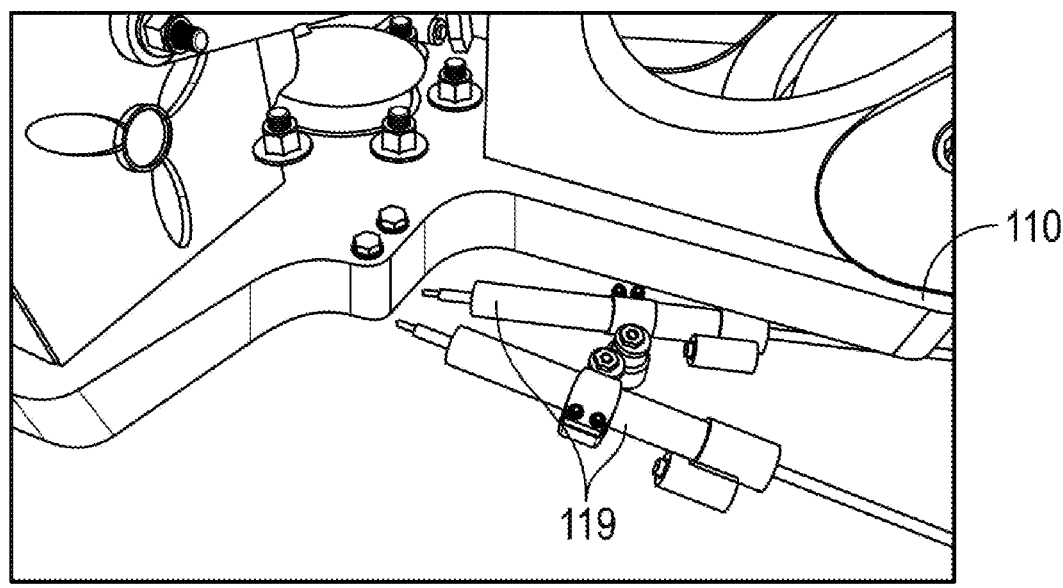
FIG. 8 is a perspective view of yaw dampeners for use in the launching system of FIG. 2.
Figure 9:
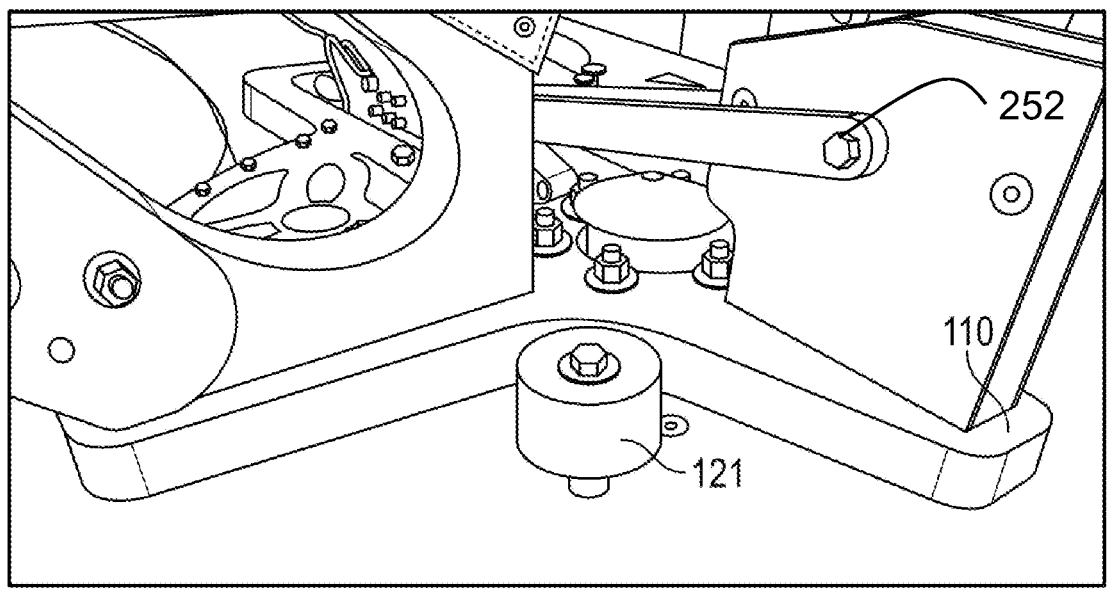
FIG. 9 is a perspective view of a mechanical stop for use in the launching system of FIG. 2.
Figure 10:
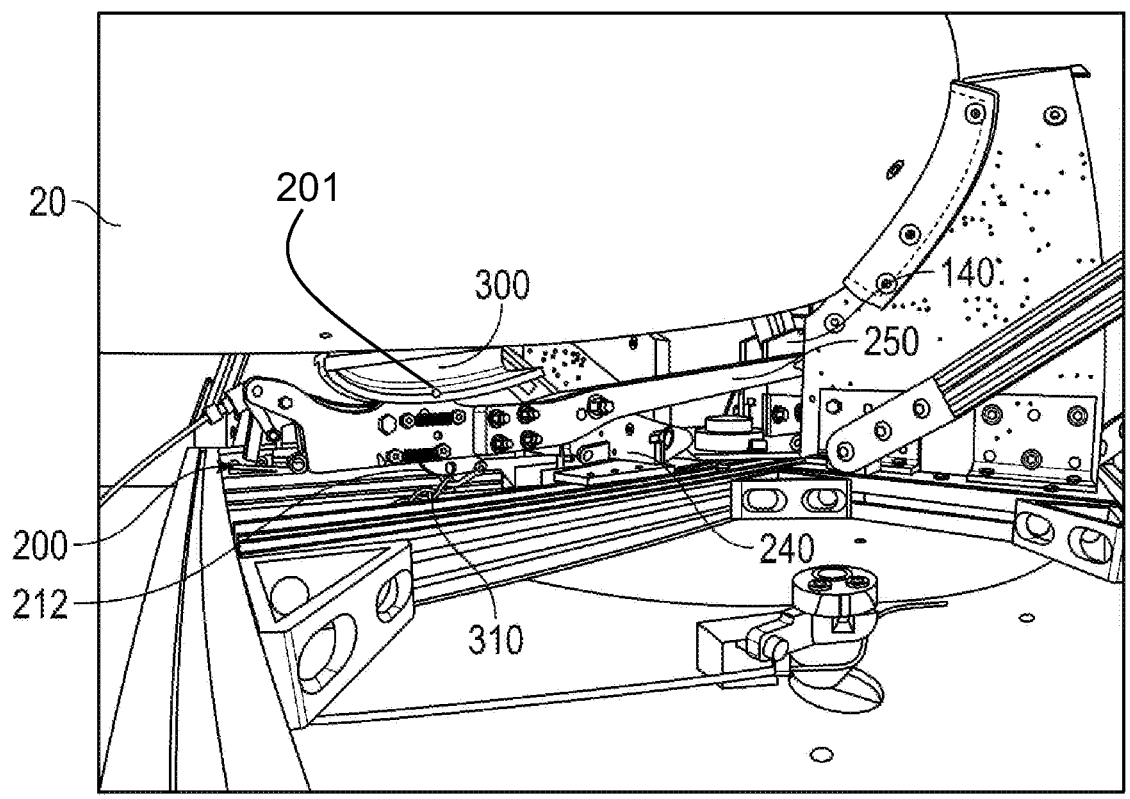
FIG. 10 is a perspective view of the launching system of FIG. 2 on a ground vehicle and with an aircraft positioned on the launching system.
Figure 11:
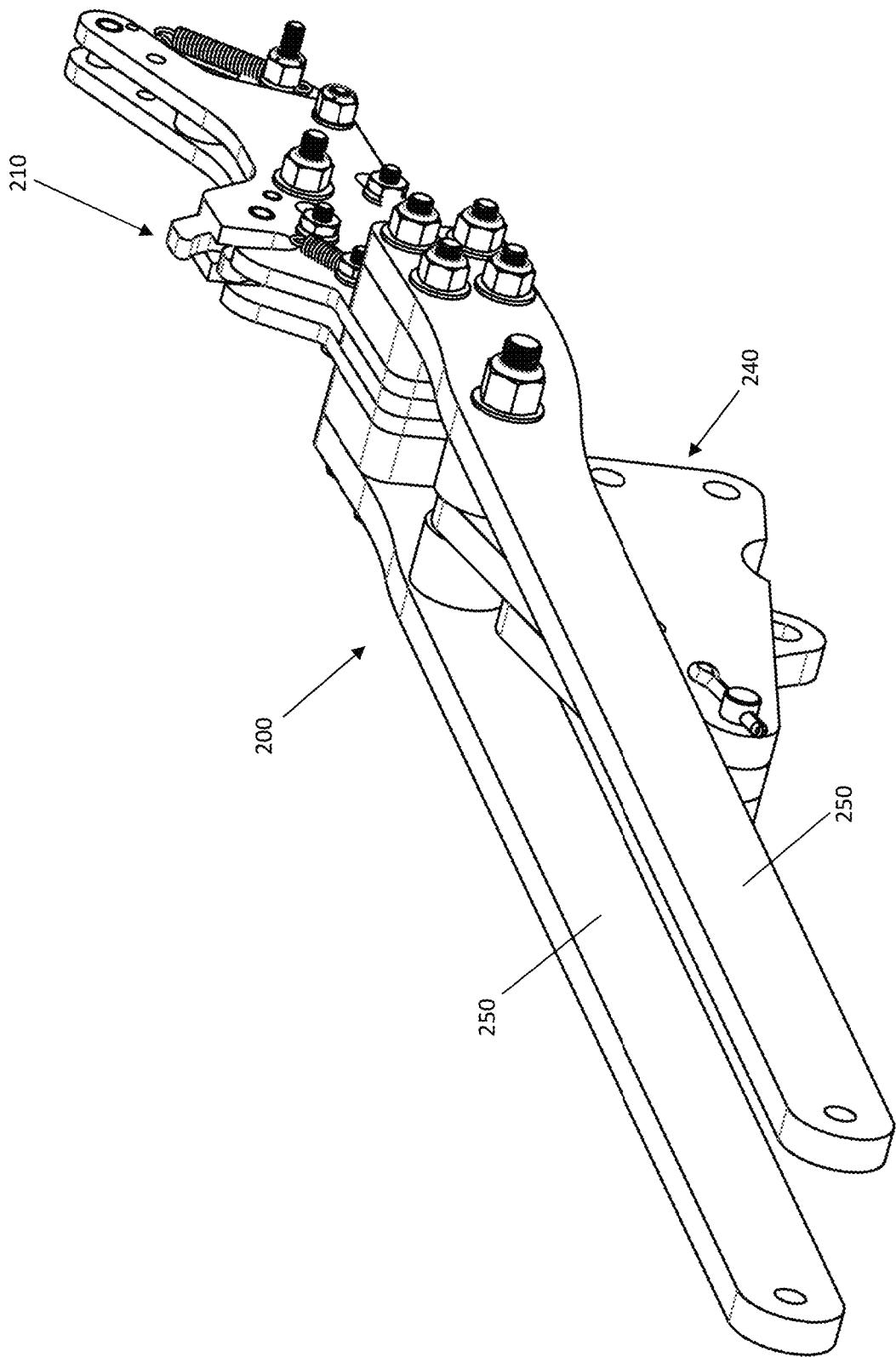
FIG. 11 is a view of a latch mechanism for use in the launching system of FIG. 2.

Preferably, a yaw brake disc 117 may be joined to the underside of base plate 110 (as shown in FIG. 6 with other elements removed for clarity) that may be engaged with a manually operable brake assembly 118 of traditional configuration (shown in FIG. 7) to serve as an arresting device to arrest excessive undesired yaw movement of launching system 100. Such a brake assembly 118 engaging yaw brake disc 117 may, for example, attach to an actuator cable that may extend from the brake assembly into the cabin of the ground vehicle on which launching system 100 is mounted. Such actuator may also provide a safety release configured to allow "pin to lock" or "pin to allow" yaw movements, which assembly may be readily implemented and configured by those skilled in the art. Still further, one or more yaw dampeners 119 (shown in FIG. 8) in the form of hydraulic cylinders of traditional configuration may be provided and extend between the frame or ground vehicle carrying launching system 100 and the base plate 110, thus providing dampened shocks that may allow full range of movement in yaw (e.g., +/−20°), but increase in resistance as the rate of yaw increases. Such yaw dampeners may be particularly helpful during launches that are being carried out in turbulent wind conditions. Still further, one or more bump stops 121 (shown in FIG. 9) or similarly configured mechanical stops may be provided on the frame or vehicle carrying launching system 100, such as a yaw-limiting pad on a post that may be positioned to set a maximum allowable movement on either side of center of the yaw direction. As the base 110 of launching system 100 approaches the limit, for example 20° from center, the base 110 will press against the dense foam pad of the bump stop 121, in turn gently arresting movement and preventing a hard bump at the bottom of the yaw dampeners 119.

Next, as mentioned above and with particular reference to FIGS. 10-19, latch mechanism 200 is pivotably mounted on launching system 100 so as to allow automatic variance in the pitch angle of the aircraft as it approaches an appropriate release velocity, and automatic release of the aircraft from the latch mechanism 200 once it achieves a particularly desired and predetermined pitch angle. Latch mechanism 200 includes a latch 210 that engages a pin 201 extending through the nose skid 300 of the aircraft to hold the aircraft to latch mechanism 200 until release, and lift arms 250 extend between the latch 210 and a pivot connection 252 on wheel cup 140. A pivoting base connector 240 likewise pivotably connects lift arms to the base plate 110 of launching system 100, which pivoting base connector 240 expands in a scissor-type movement to control and guide the vertical movement of the lift arms 250 as they pivot latch 210 and the attached aircraft from its initial nose-down attitude to the intended launch pitch angle. A release actuator 310, such as a chain, cable, or similarly configured connector, is fixed at one end to the frame mounting launching system 100 and at the other end to a latch arm 212, which latch arm 212 pivots when pulled by fixed release actuator 310 (as latch mechanism 200 pitches upward with the aircraft as it approaches release velocity) to ultimately release the pin of nose skid 300 from latch mechanism 200 upon attainment of the intended pitch angle, thus allowing the aircraft to separate and gently lift away from launching system 100.

Figure 12:
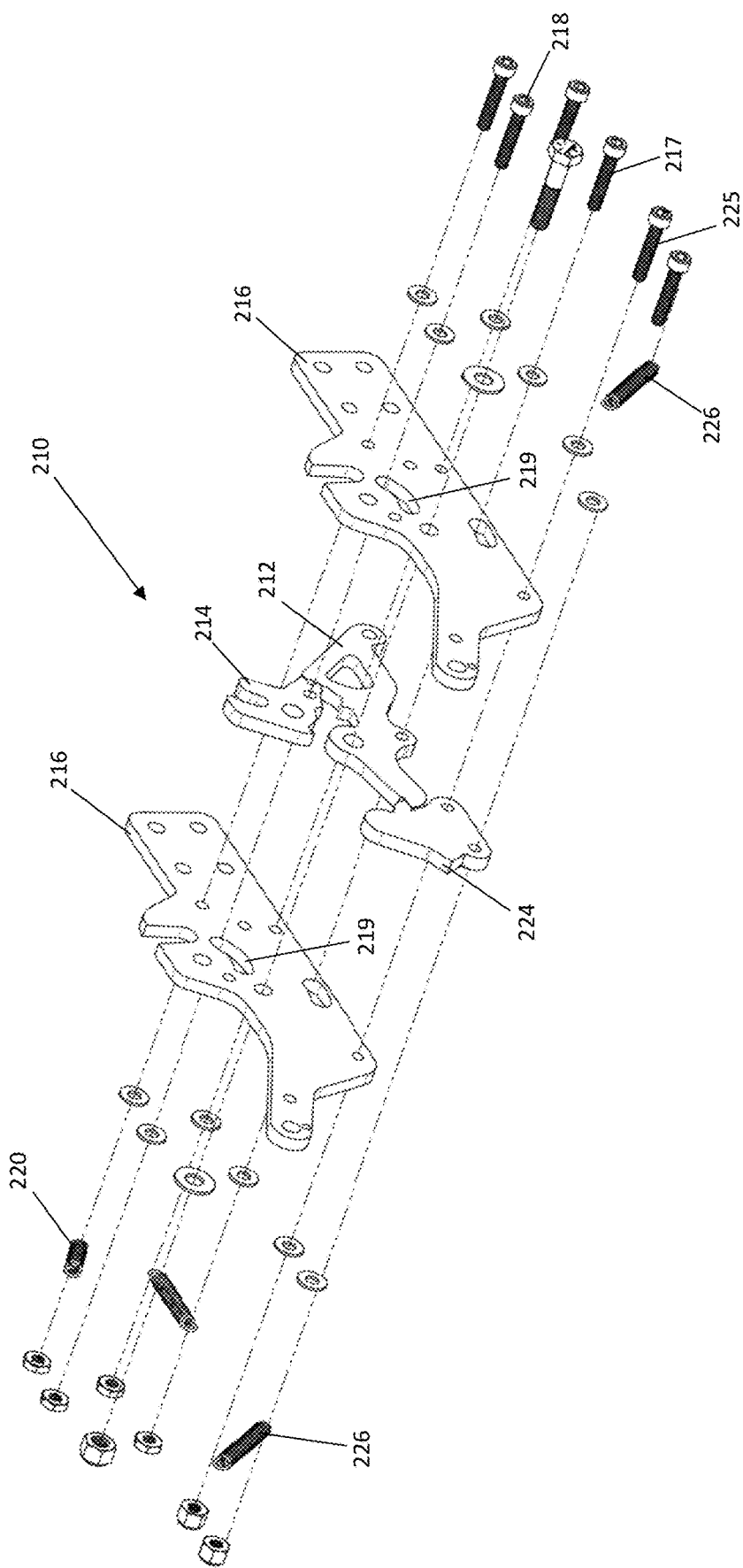
FIG. 12 is an exploded view of a latch for use in the latch mechanism of FIG. 11.
Figure 13:
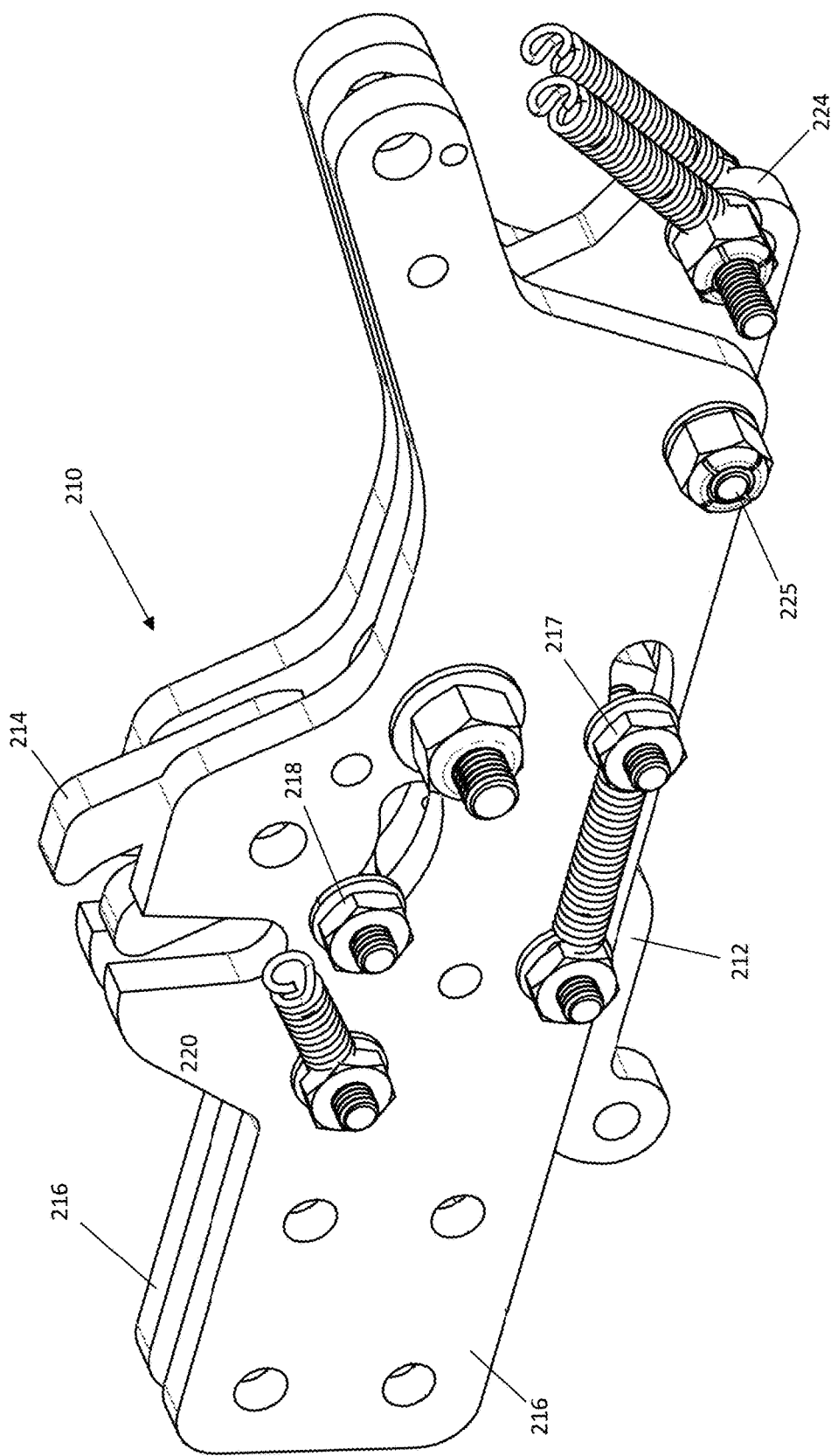
FIG. 13 is an assembled view of the latch of FIG. 12.
Figure 14:
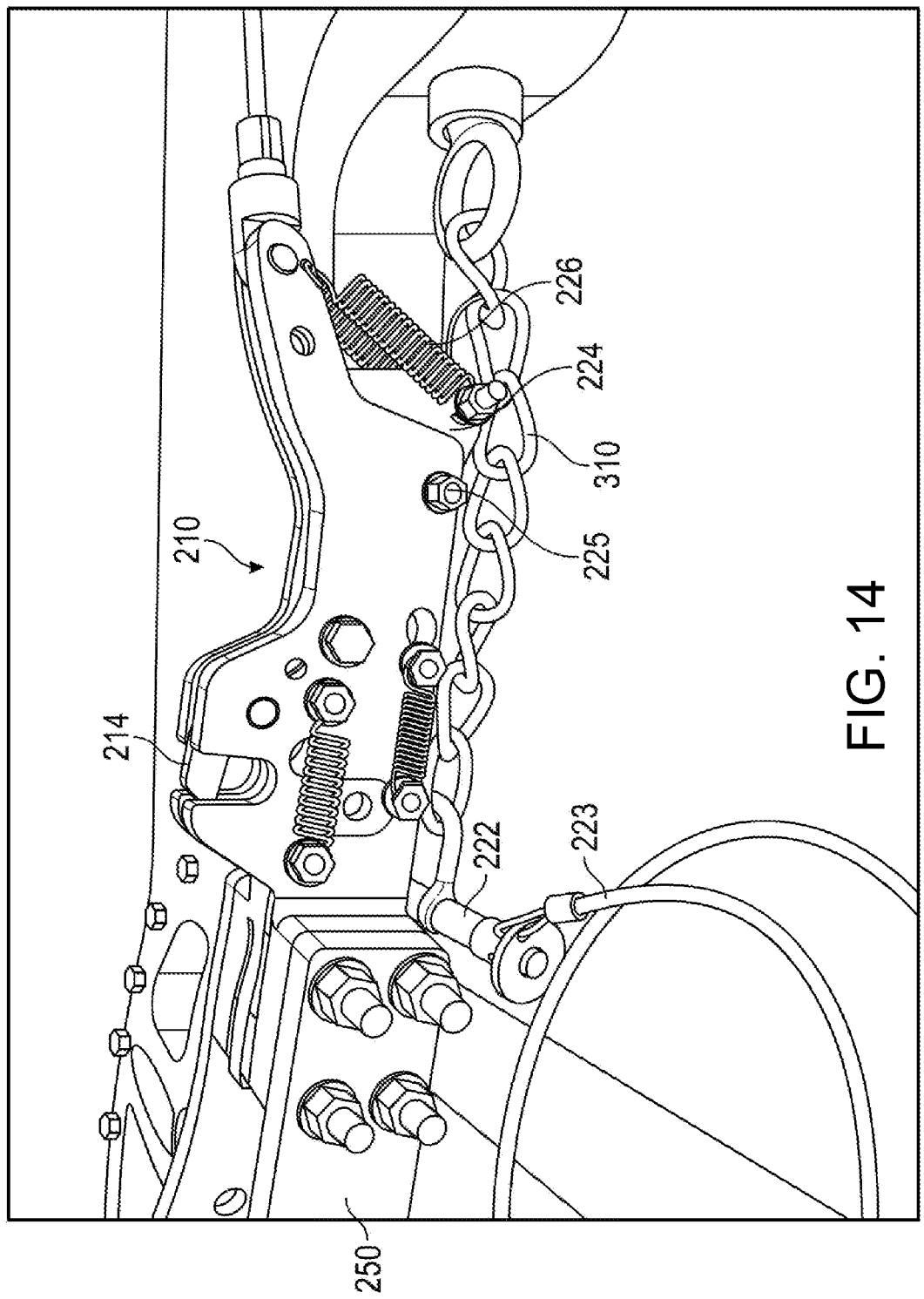
FIG. 14 is a side view of the latch of FIG. 13 engaged with the launching system of FIG. 2.
Figure 15:
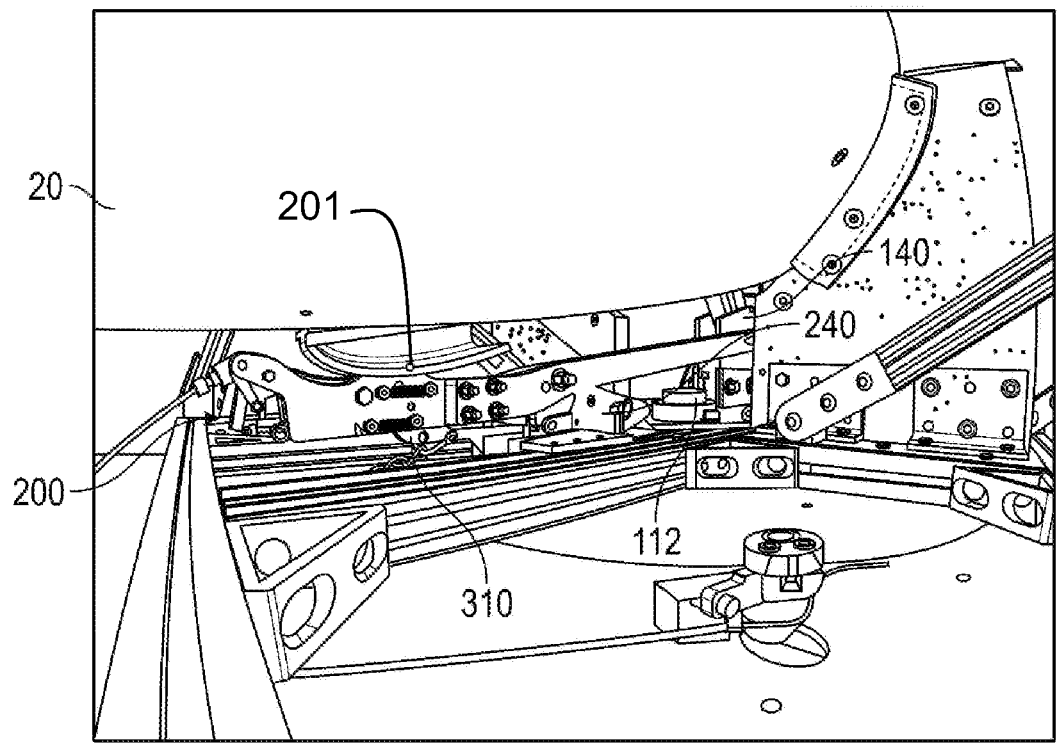
FIGS. 15-19 show a sequence of movements of the latch mechanism of FIG. 11 as an aircraft changes pitch angle from an initial nose-down position (FIG. 15) to a launched position (FIG. 19).
Figure 16:
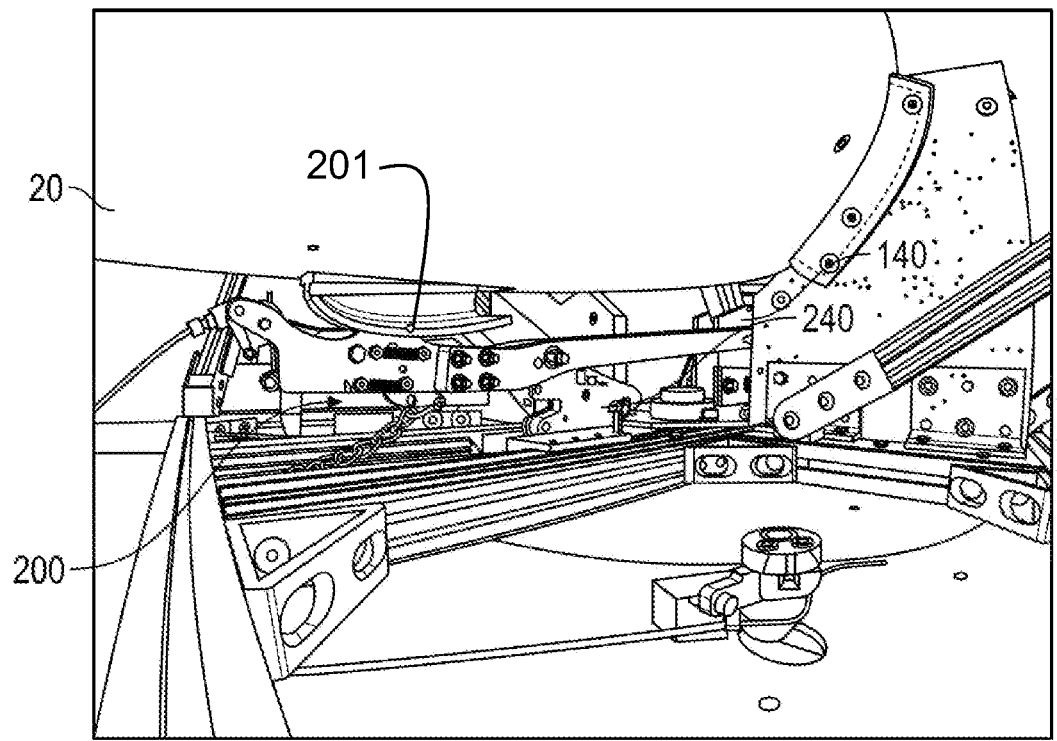
Figure 17:
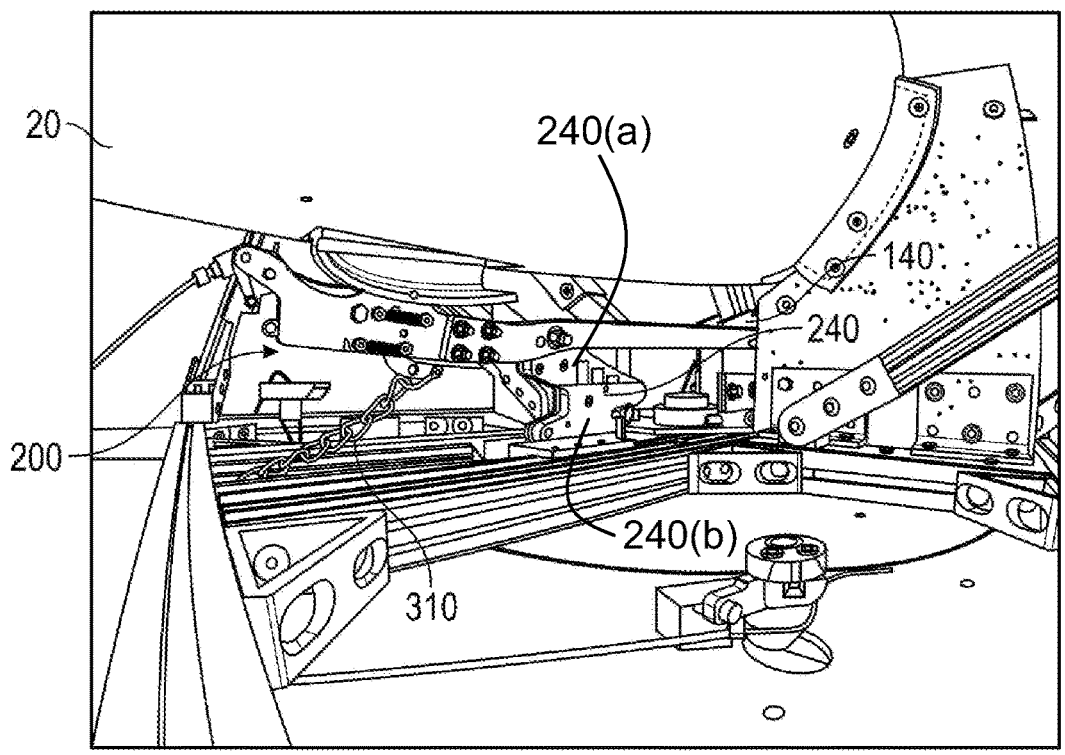
Figure 18:
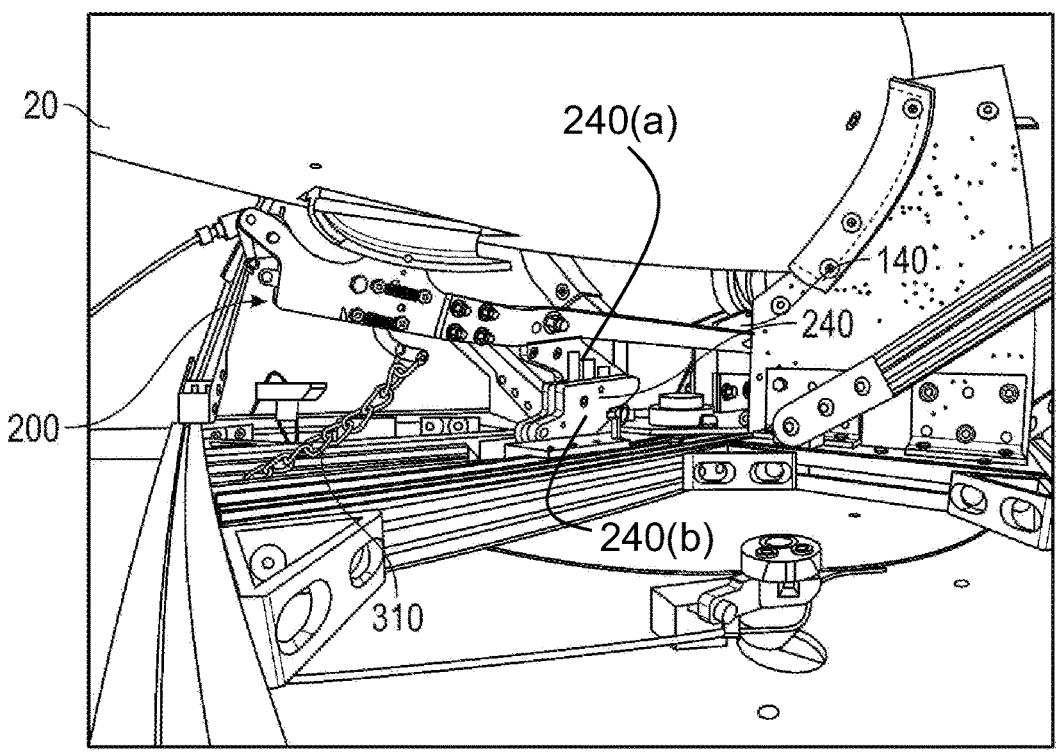

FIG. 12 provides an exploded view and FIG. 13 an assembled view of latch 210, and FIG. 14 shows an up-close side view of latch 210 in latch assembly 200 and its connection to the actuators that engage latch 210. Latch 210 is the mechanism by which an aircraft is retained on and released from launching system 100. As mentioned above, latch 210 is configured to release the aircraft via release actuator 310, which release actuator 310 pulls latch arm 212 once the aircraft has pitched upward to a preset pitch angle of attack. Pulling the latch arm 212 rotates the latch arm with respect to latch fences 216 (about latch pin pivot bolt 217), in turn causing latch hook 214 to rotate about latch hook pivot bolt 218. Latch hook pivot bolt 218 is positioned in slots 219 of latch fences 216, and is configured to slide within slots 219 to cause latch hook 214 to move away from the pin in the nose skid of the aircraft, causing the aircraft to become free and able to climb into the air. A latch hook spring 220 preferably biases latch hook pivot bolt 218 to cause latch hook 214 to be biased towards an engaged or locked position.

Preferably and as particularly shown in FIG. 14, release actuator 310 may be held to latch arm 212 by a removable pin 222, which removable pin 222 is in turn attached to a cable 223 that may be remotely activated by a user in the ground vehicle cabin. Pin 222 thus serves both to prevent premature release of the aircraft from the launching system 100 and as a safety release latch.

Further, and with continued reference to FIGS. 12-14, a release safety lock 224 may be provided that is configured to enable jamming of latch hook 214 from releasing the nose skid of the aircraft, thus allowing a manual abort to the launch sequence. Release safety lock 224 is configured to pivot about safety lock pivot bolt 225, and is biased by springs 226 towards engagement with latch arm 212. In this configuration, safety lock 224 is operable to selectively allow latch arm 212 to engage latch hook 214 to either allow or block pivoting of latch hook 214 with respect to the nose skid pin. Release safety lock 224 is preferably attached to a cable that may be remotely activated by a user in the ground vehicle cabin, with the actuator configured to allow "pin to lock" or "pin to allow" skid release.

Referring again to FIG. 11, base connector 240 comprises a scissoring connector having an internal extension panel 240(a) pivotably attached to lift arms 250 and to external fixed panels 240(b) that in turn are affixed to the base of launching system 100. Base connector 240 helps to guide latch mechanism 200 as it modifies the pitch angle of the aircraft from the initial nose-down position to the up or "level" position. Base connector 240 is preferably configured to allow 12 degrees of pitch rotation traversing the aircraft from a zero-lift condition to a lift capable position without requiring the aircraft to be released by the latch 210. The aircraft is thus retained on the launching system 100 until it is rotated level, after which the latch mechanism releases the aircraft and drops away and clear of the aircraft.

Figure 19:
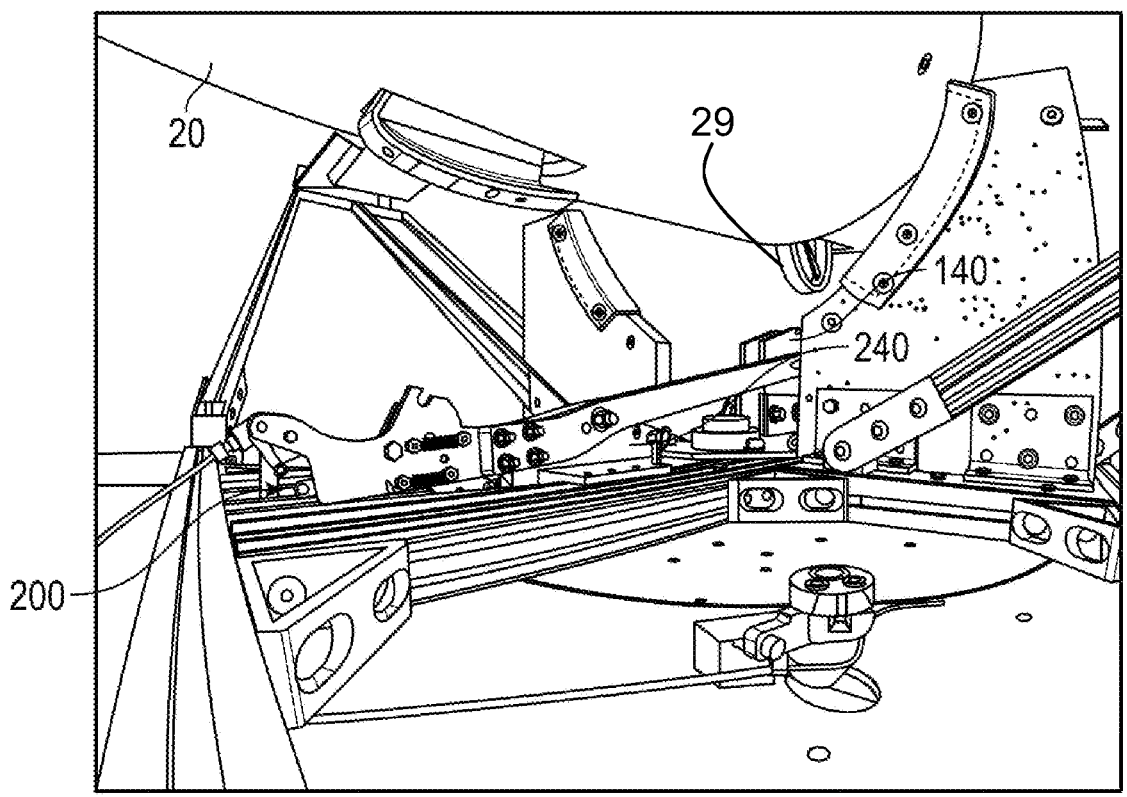

FIGS. 15-19 show the sequence of movements of latch mechanism 200 as the aircraft 20 changes pitch angle from the nose-down position (FIG. 15) to the release position (FIG. 18) and ultimate clearance from launching system 100 (FIG. 19). Prior to launch, the aircraft is restrained in the position shown in FIG. 15 as the ground vehicle accelerates, with the wheel of aircraft sitting in wheel cup 140 and the release actuator 310 under slight tension. With the aircraft at incidence for zero lift, the wing is not loaded during its time on the ground vehicle. The elevator is also trimmed to a deflection, thus removing any nose-up pitching moment due to the airstream pushing down on the tail. Likewise, at the start of movement of the ground vehicle, the yaw pivot may optionally be pinned so that the aircraft is aligned with the ground vehicle, and the pin may be removed for takeoff acceleration. Once the yaw pin is pulled, the aircraft and launching system 100 are free to rotate into the ambient wind direction. The center of gravity of the aircraft is located above, or just behind, the yaw bearing formed by hub 112 to create a stable support for the aircraft and to prevent small perturbations from inducing large oscillations in the system.

In the foregoing configuration, prior to or as the ground vehicle reaches stall speed, a crew member may pull any engaged releases to free the aircraft's restraint and arm the aircraft for launch. After such releases, in order to aid in minimizing the risk of having the aircraft bounce out of the relatively shallow wheel cup 140 during the launching operation, the aircraft preferably maintains a nose-down attitude to prevent any appreciable lifting force, such that the entire mass of the vehicle is working to keep the aircraft in the cradle. Further, the suspension of the aircraft's landing gear will tend to absorb relatively small bumps.

At rotation (FIGS. 16-18), the aircraft rotates in pitch about its wheel in wheel cup 140, giving an angle of attack for the wing to start producing lift. With this flight attitude trimmed for climb, and with the propeller providing excess power, the aircraft smoothly begins climbing away from the launching system 100 (FIG. 19). At this point, because both the ground vehicle and the aircraft are travelling at approximately the same speed, the separation is primarily in the vertical direction, after which the ground vehicle accelerates forward to vacate the runway. Also at this point, because the aircraft has already yawed into a zero-sideslip condition on the rotating launching system 100, the wings remain mostly level during the rotation and release event. After rotation, the pilot or autopilot may then feed in throttle to a climb-out setting (presumably full throttle) to then carry the aircraft to its intended altitude.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A launching system for an aerial vehicle, comprising:
a fixed hub;
a base including a base plate pivotably mounted to the fixed hub, wherein said base plate is pivotable about a first, generally vertical axis; and
a latch mechanism pivotably mounted to the base plate, wherein said latch mechanism is pivotable about a second axis that is perpendicular to the first axis, said latch mechanism comprising:
a latch;
a latch hook configured to engage a pin on an underside of a fuselage of said aerial vehicle;
a release actuator operatively engaging the latch hook and attached to a fixed location on the launching system, wherein said release actuator is configured to cause the latch hook to open and release said pin upon upward pivoting of said latch mechanism, and at least one lift arm pivotably mounted to said base at a pivot connection, and wherein said latch is mounted to said at least one lift arm at an end of said lift arm opposite said pivot connection.

2. The launching system of claim 1, wherein said base plate is automatically pivotable about said first axis so as to align said latch mechanism with a direction of a headwind impacting said launching system.

3. The launching system of claim 1, said latch mechanism further comprising a latch arm mechanically engaging said latch hook, and wherein said release actuator is attached to said latch arm.

4. The launching system of claim 1, said latch mechanism further comprising a safety lock mechanically engaging said latch arm and a manually operable safety release, wherein said safety lock is pivotable to move said latch arm into a jamming position that prevents the latch hook from disengaging said pin.

5. The launching system of claim 1, further comprising a scissoring base connector having a first panel pivotably attached to said base, and a second panel pivotably attached to said first panel and pivotably attached to said at least one lift arm.

6. The launching system of claim 1, said base further comprising a plurality of fuselage supports affixed to a top surface of said base plate.

7. The launching system of claim 6, further comprising a plurality of wing supports affixed to and extending outward and upward from said base plate and each positioned to contact an underside of a wing of said aerial vehicle when the fuselage of said aerial vehicle is positioned in said fuselage supports.

8. The launching system of claim 7, further comprising a wheel cup affixed to said top surface of said base plate and positioned to receive a landing gear wheel of said aerial vehicle when the fuselage of said aerial vehicle is positioned in said fuselage supports.

9. The launching system of claim 8, wherein said latch mechanism is pivotably mounted to said wheel cup.

10. A ground vehicle-mounted launching system for an aerial vehicle, comprising:
a fixed hub;
a base including a horizontally pivotable base plate; and
a vertically pivotable latch mechanism pivotably mounted to the base plate, said latch mechanism comprising:
a latch;
a latch hook configured to engage a pin on an underside of an aerial vehicle fuselage;
a release actuator operatively engaging the latch hook and attached to a fixed location on the launching system, wherein said release actuator is configured to cause the latch hook to open and release said pin upon upward pivoting of said latch mechanism, and
at least one lift arm pivotably mounted to said base at a pivot connection, and wherein said latch is mounted to said at least one lift arm at an end of said lift arm opposite said pivot connection.

11. The ground vehicle-mounted launching system of claim 10, wherein said base plate is automatically pivotable about said first axis so as to align said latch mechanism with a direction of a headwind impacting said launching system.

12. The ground vehicle-mounted launching system of claim 10, said latch mechanism further comprising a latch arm mechanically engaging said latch hook, and wherein said release actuator is attached to said latch arm.

13. The ground vehicle-mounted launching system of claim 10, said latch mechanism further comprising a safety lock mechanically engaging said latch arm and a manually operable safety release, wherein said safety lock is pivotable to move said latch arm into a jamming position that prevents the latch hook from disengaging said pin.

14. The ground vehicle-mounted launching system of claim 10, further comprising a scissoring base connector having a first panel pivotably attached to said base, and a second panel pivotably attached to said first panel and pivotably attached to said at least one lift arm.

15. The ground vehicle-mounted launching system of claim 10, said base further comprising a plurality of fuselage supports affixed to a top surface of said base plate.

16. The ground vehicle-mounted launching system of claim 15, further comprising a plurality of wing supports affixed to and extending outward and upward from said base plate and each positioned to contact an underside of a wing of said aerial vehicle when a fuselage of said aerial vehicle is positioned in said fuselage supports.

17. The ground vehicle-mounted launching system of claim 16, further comprising a wheel cup affixed to said top surface of said base plate and positioned to receive a landing gear wheel of said aerial vehicle when the fuselage of said aerial vehicle is positioned in said fuselage supports.

18. The ground vehicle-mounted launching system of claim 17, wherein said latch mechanism is pivotably mounted to said wheel cup.

* * * * *